United States Patent [19]
Warren

[11] Patent Number: 5,840,371
[45] Date of Patent: Nov. 24, 1998

[54] TREATMENT FOR IMPROVED CONDUCTIVITY OF COLLECTOR-ELECTRODE INTERFACE IN LAMINATED LITHIUM-ION RECHARGEABLE BATTERIES

[75] Inventor: Paul C. Warren, Far Hills, N.J.

[73] Assignee: Bell Communications Research, Inc., Morristown, N.J.

[21] Appl. No.: 887,507

[22] Filed: Jul. 2, 1997

[51] Int. Cl.[6] ....................................... B05D 3/02
[52] U.S. Cl. .................. 427/377; 29/623.1; 29/623.5; 156/272.2; 429/192
[58] Field of Search ................ 29/623.1, 623.5; 429/192; 156/272.2; 822/377

[56] References Cited

U.S. PATENT DOCUMENTS 4,598,022   7/1986   Haque et al. .................. 427/488 R
5,470,357  11/1995   Schmutz et al. .................. 29/623.5

*Primary Examiner*—Michael Lusignan
*Attorney, Agent, or Firm*—Joseph Giordano; David A. Hey; Loria B. Yeadon

[57] ABSTRACT

A coating of a vinylidene fluoride polymer on a metal foil is heated at about 350° C. to 450° C. in a non-oxidizing atmosphere of inert gas to provide a rechargeable battery current collector having an exceptional bonding surface which maintains a long-lasting and highly-conductive laminate interface with an associated polymeric battery electrode composition.

6 Claims, 4 Drawing Sheets

5

TREATMENT FOR IMPROVED CONDUCTIVITY OF COLLECTOR-ELECTRODE INTERFACE IN LAMINATED LITHIUM-ION RECHARGEABLE BATTERIES

BACKGROUND OF THE INVENTION

The present invention relates to rechargeable electrolytic battery cells comprising polymeric film composition electrodes and separator membranes, and metallic foil or mesh current collectors, which are typically laminated under heat and pressure to form a unitary battery cell structure. In particular, the invention provides a method of treating such current collector elements to ensure a lasting, uniform collector/electrode interface which provides high electrical conductivity and cycling stability over long periods of storage and use in a broad range of temperatures.

Electrolytic battery cells particularly suited to use of the present invention include Li-ion intercalation cells of the type described in U.S. Pat. No. 5,470,357, the disclosure of which is incorporated herein by reference. Such cells are fabricated of respective positive and negative electrode members comprising finely-divided active materials, such as lithium-source $LiMn_2O_4$ and carbon, dispersed in a polymeric matrix and formed into a flexible layer or membrane. These membranes are laminated to an interposed electrically-insulating separator membrane, usually comprising a similar polymeric material, which will ultimately contain a uniformly distributed organic solution of a lithium salt to serve as an electrolytic, ion-conducting bridge between the electrodes and enable the intercalation of Li ions flowing reversibly to and from the active materials of those electrodes during the charge and discharge cycles of the battery cell. Finally, to facilitate the concomitant flow of electrons in the battery cell circuit, each of the positive and negative electrode members has an associated current collector member which also serves as a terminal base for the attachment of a conductor leading, in use, to a utilization device.

While the similarity of the polymer in the matrix compositions of the electrode and separator members generally ensures a close and substantially uninterrupted continuity at the lamination interfaces of those members, the electrode/collector interfaces do not enjoy a similar advantage. The basic dissimilarity of the polymeric and metallic materials and the relative ease of formation of oxides on the interface surfaces of collector foils or grids, typically composed of copper and aluminum, lead to less than optimum adhesion between these members and, in addition to the inherent, deleterious insulating effect of the oxides, enable the delamination of the members and the intervention of electrically-insulating electrolyte solvent which further degrade the essential cell circuit conductivity.

This problem was alleviated to some extent, as described in the aforementioned patent, by means of a pretreatment comprising the application and heating of a superficial layer of matrix polymer on the surface of the current collector foil or grid prior to lamination with its associated electrode member. Over time, however, whether due to the formation of additional oxides or the failure of lamination interface, the performance of the resulting battery suffered a loss of capacity and cycling stability. The present invention has effectively solved this lingering problem and has also provided a treatment process which is more economical in both materials and time.

SUMMARY OF THE INVENTION

The present invention provides a method of treating metallic foils or grids in order to achieve a substantially oxide-free surface which is compatible with the polymeric composition of Li-ion intercalation electrodes and promotes lasting and uniform thermal lamination interfaces between these electrolytic cell members. In a manner similar to the procedure of the above-noted patent, the surface of a current collector member, such as the copper expanded-foil grid for a negative electrode, is cleaned of process oils and residues in a preliminary operation which entails a brief rinse in a solvent, such as acetone. The surface is then coated by spraying, dipping, or the like with a thin layer of a dilute solution of a polymer compatible with, or preferably the same as, the polymer of the electrode composition. After a short period of drying to remove the volatile solvent of the applied coating, the collector member is heated for few minutes, in a non-oxidizing atmosphere, typically of an inert gas such as nitrogen or argon, at a temperature at or slightly above that of the initial decomposition of the coated polymer. After cooling to a working ambient under such non-oxidizing conditions, the current collector material is ready for lamination with an electrode membrane, in the manner usually employed in previous practices.

In the course on the investigations leading to the present invention, it was discovered that the upper temperature limit of about 350° C. employed in the process of the '357 patent to avoid undesirable excessive metal oxidation was not entirely sufficient to thoroughly bind the pretreatment polymer film to the collector metal surface and that, as a result, later intervention of electrolyte solvent and oxidation was possible, resulting in degradation of conductivity and cell performance. The present utilization of an inert atmosphere during the period of setting the protective film allows use of temperatures ranging beyond those previously employed up to about 450° C. for periods of a couple of minutes, as compared with the few seconds limit of prior practice, thus providing great latitude for achieving optimum film adherence.

The pretreatment polymer is selected on the basis of the polymer employed in the electrode compositions, which latter preferably comprise a copolymer of polyvinylidene fluoride-hexafluoropropylene (PVdF-HFP) having 6% to 25%, preferably 10% to 15%, HFP. The polymer is applied thoroughly, by dipping, brushing, or spraying, to a clean metal grid or foil surface as a solution of about 0.1% to 2%, preferably 0.75% to 1%, copolymer in a volatile organic solvent, such as acetone, which is subsequently removed by simple air drying at ambient conditions. The coated metal stock may then be heat-treated for 1 to 2 minutes in a batch or continuous process by placement in or movement through an inert atmosphere, such as nitrogen, maintained in an oven or fluidized process bed at a temperature of about 350° C. to 450° C. Cooling to a working ambient is likewise carried out in an inert atmosphere.

BRIEF DESCRIPTION OF THE DRAWING

The present invention will be described with reference to the accompanying drawing of which.

DESCRIPTION OF THE INVENTION

Figure 1:
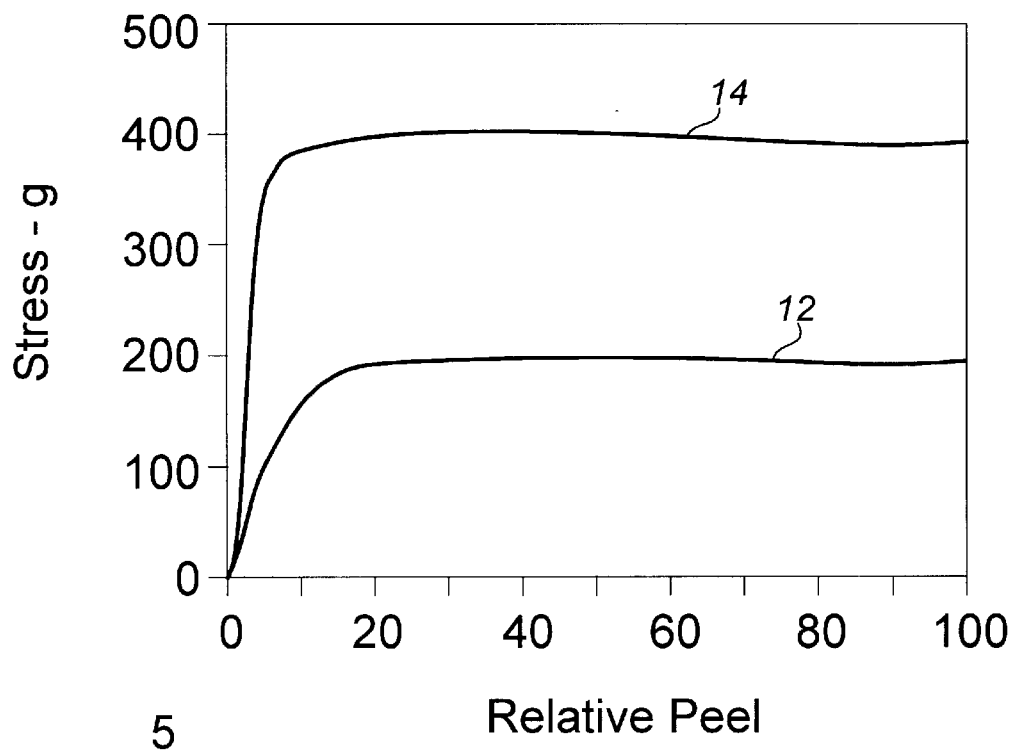
FIG. 1 is a graph of comparative interface adhesion between a battery electrode composition and current collectors treated according to the prior art and the present invention.

The present invention essentially comprises a process for treating the surface of a metal foil or grid which is to be used as an electrical current collector in a laminated rechargeable battery cell structure. The purpose of the treatment is to enhance the adhesion between the current collector element and an associated electrode during the thermal lamination assembly of the battery cell layers. Such assembly and the types of materials used in fabricating the battery cells are for the most part described in U.S. Pat. No. 5,470,357 and related patent disclosures.

The preferred compositions from which the battery electrodes and separator/electrolyte elements are formulated comprise a poly(vinylidene fluoride) copolymer of about 75% to 92% by weight vinylidene fluoride (VdF) and 8% to 25% by weight hexafluoropropylene (HFP). To provide an optimum degree of flexibility and thermal cohesion during lamination, and to provide a basis for electrolyte interchange upon subsequent cell activation, the compositions further comprise about 20% to 70% by weight of a compatible organic plasticizer, such as dibutyl phthalate (DBP). Each of the positive and negative electrode compositions further comprise, usually in finely-divided dispersed form, electrolytically-active components which are essentially materials capable of intercalating lithium ions during the charge/discharge cycles of the ultimate battery.

As described in the '357 patent, e.g., in Example 9, adhesion between the current collector and electrode elements during lamination of the battery cell components may be improved by precoating the foil or grid collector stock with a dilute solution of the electrode matrix VdF-HFP copolymer and heating the coated stock to set the copolymer and provide a compatible transition layer. The cohesion between the similar copolymer materials of the electrode and the transition layer provides a significant degree of added lamination integrity and results in the desired unitary battery cell body.

It has since been noted, however, that over the course of storage and use of batteries constructed in the earlier-described manner, the initial high performance of some cells inexplicably degraded along with a measured increase in the internal electrical resistance. Physical examination of cells exhibiting this phenomenon revealed sporadic delamination or failure of adhesion between collector and electrode elements which in addition to allowing separation and current interruption at this interface also enabled the intervention of insulating electrolyte solvent between these elements with the result of further delamination. Extensive investigation into the cause of the lamination failure suggested that the limited temperature and processing time required of the pretreatment operation in order to avoid degradation of the precoat copolymer film, as well as to avoid formation of poorly conducting oxidation at the surface of the metal current collector element, was insufficient to effect a substantially permanent bonding of the precoat film to the collector surface.

These indications led to the present invention in which a sheet of foil or grid current collector stock is coated with a solution of 0.1% to 2%, preferably 0.75% to 1%, PVdF-HFP copolymer in a volatile solvent, such as acetone, air-dried to remove the solvent, and then heated at about 350° C. to 450° C., preferably at about 400° C. to 425° C., for a period of 1 to 2 minutes in an inert, non-oxidizing atmosphere of nitrogen or the like. This heating may be readily carried out in a processing oven comprising a bed of sand or similar particulate material fluidized by a stream of nitrogen. After the heating period, the coated collector stock is cooled to room temperature in a non-oxidizing atmosphere to ensure against the formation of poorly conducting metal oxide.

The treated collector material may thereafter be utilized in the previously-described manner by lamination at about 120° C. to 150° C. with an appropriate electrode layer fashioned of a composition of active intercalation material, such as carbon or $LiMn_2O_4$, dispersed in a matrix of the PVdF-HFP copolymer. The resulting electrode/collector interface exhibits a more permanent high-conductivity bond than previously achieved, even with electrode compositions of increased active solids content and under activated condition, i.e., in the presence of electrolyte solvent.

The present invention may be utilized with any of the battery electrode and electrolyte components described in the '357 patent and in similar related publications. In the interest of further clarity, however, a number of representative compositions, along with typical processing steps, are included in the following examples.

EXAMPLE 1

A stock negative electrode material used to test the efficacy of the present invention was prepared substantially in the manner of Example 8 of the '357 patent by casting the composition from a solvent dispersion to obtain an electrode membrane comprising, in weight ratio, about 56% graphite and 3% Super P conductive carbon homogeneously distributed in a matrix of about 16% VdF-HFP copolymer (88:12 Atochem Kynar FLEX 2801) and 25% dibutyl phthalate. The resulting flexible electrode material was cut to desired size and used as the laminated electrode element in the following test examples.

EXAMPLE 2

A stock current collector sheet was prepared by dipping a 300×300 mm expanded copper grid (MicroGrid precision expanded foil—Delker Corporation) into a 1% acetone solution of the copolymer of Example 1 and air-drying for several minutes at room temperature. The sheet was divided into two equal sections, and the first section was oven-heated in air at about 350° C. for about 10 seconds and then immediately cooled in air to obtain the prior art collector element of Example 9 of the '357 patent. The remaining half of the coated stock grid was rolled into a cylinder and placed into a closed-end aluminum tube which was continually flushed with nitrogen. The tube was immersed for about one minute in a 400° C. sand bed fluidized with nitrogen and then removed from the bed to cool to room temperature in the nitrogen atmosphere. A pair of test strips of about 150×25 mm was cut from each of the treated collector samples and each pair was laminated at about 120° C. to opposite sides of a 125×25 mm strip of the electrode stock of Example 1. Each of the test laminates was in turn mounted by the extending grid tabs in a tensile test machine where the yield point of the laminate adhesion under increasing stress was determined. Results of these tests may be seen in FIG. 1 as traces 12 of the prior collector treatment and 14 of the present invention. In addition to the 100% increase in adhesion strength exhibited by the material of the invention, it was observed from the film of electrode residue on the collector surface that the interface adhesion exceeded the cohesive strength of the electrode composition. The prior art material, on the other hand, separated at the electrode/collector interface.

EXAMPLE 3

Figure 2:
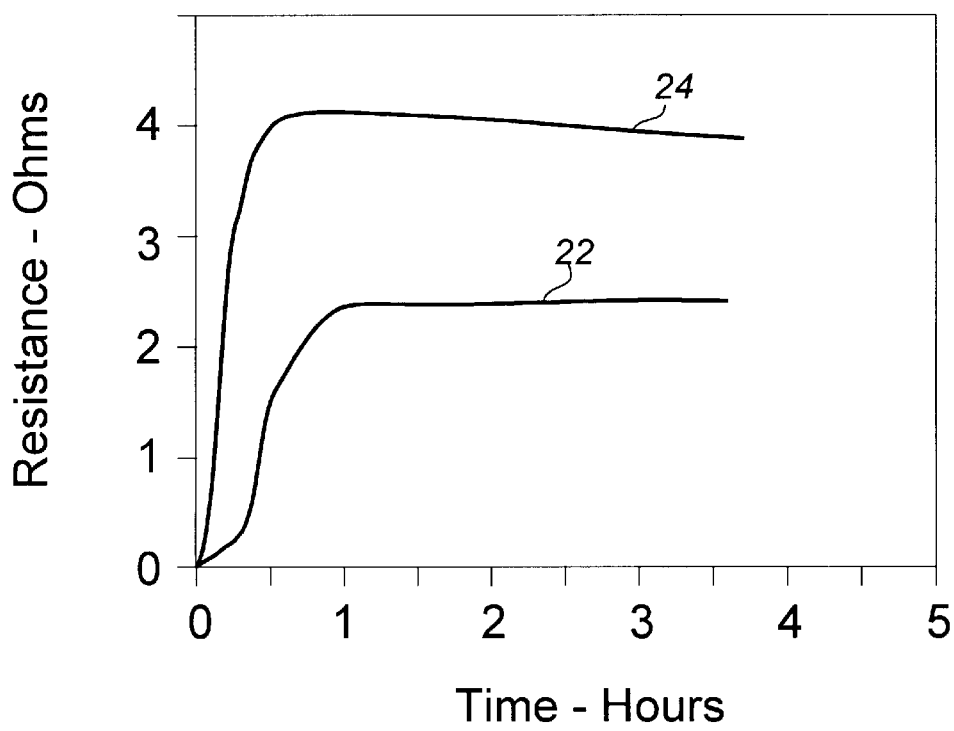
FIG. 2 is a graph of comparative battery electrode interface electrical resistance after exposure to electrolyte solvent for current collectors treated according to the prior art and the present invention.

Samples of collector grids prepared as in Example 2 according to the '357 patent and the present invention were similarly laminated to each side of respective sections of the negative electrode material of Example 1. Additional sections of electrode membrane were laminated to the exposed surfaces of the grid sample in order to completely encase the collector samples within the respective laminate assemblies. The extending grid tabs of each test assembly were then soldered to conductor leads which were subsequently connected to a four point resistance meter for testing. During each test period, a laminate assembly was immersed in propylene carbonate, a commonly-employed electrolyte solvent, while the electrical resistance between the grids, i.e., across the intervening electrode membrane and laminate interfaces, was continually measured. The results of these tests are shown in FIG. 2 where, at trace 22, the laminated material comprising a collector grid treated in an inert atmosphere according to the present invention exhibited equilibration to a lower resistance (greater retained conductivity), while the prior art treatment, at trace 24, showed the higher resistance development indicative of a poorly conducting oxidized copper surface and insulating solvent intervention. In addition to minimizing such an increase in performance-degrading resistance, the present treatment significantly limits the occurrence of interfacial spacings which might otherwise harbor the undesirable accumulation of elemental lithium during the recharging of a battery cell.

EXAMPLE 4

Figure 3:
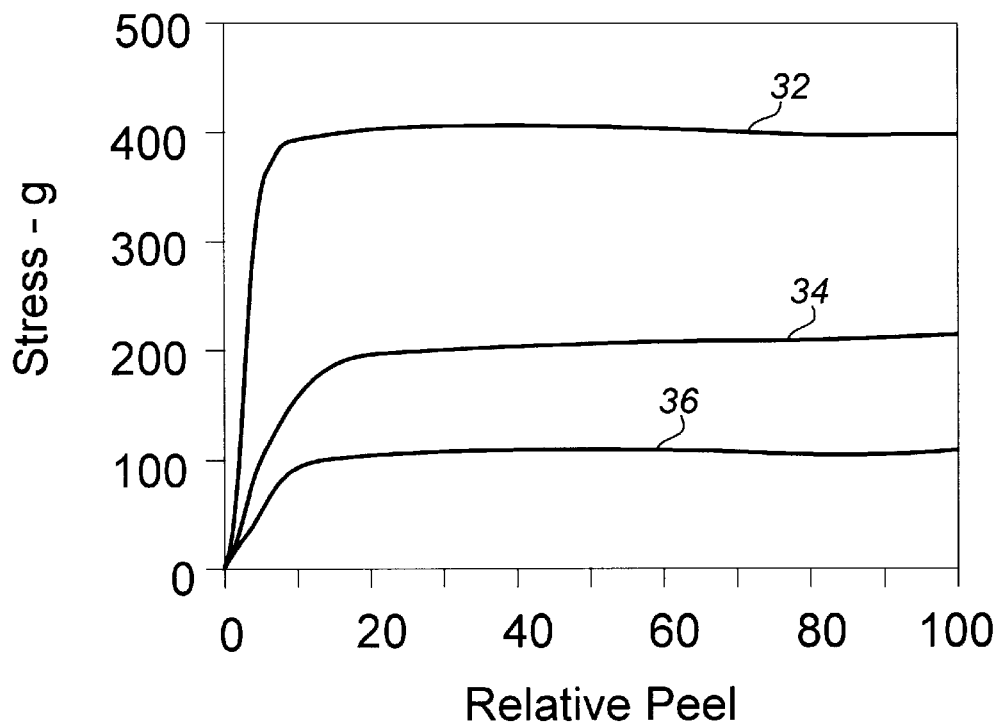
FIG. 3 is a graph of comparative interface adhesion between a current collector treated according to the present invention and battery electrodes of varying solids composition.

Electrode membranes were prepared in the manner of Example 1 using increasing ratios of active intercalating carbon component, a means normally employed to achieve greater current density in a resulting battery. Laminates tested according to Example 2 exhibited complete interface adhesion with yield points as shown in traces 32, 34 and 36 of FIG. 3 for compositions of 56%, 65%, and 70% solids, respectively. The decrease in these values may be attributed to the decreasing ratio of binder matrix to carbon, since in each instance the interface adhesion exceeded the electrode composition cohesive bond.

EXAMPLE 5

Figure 4:
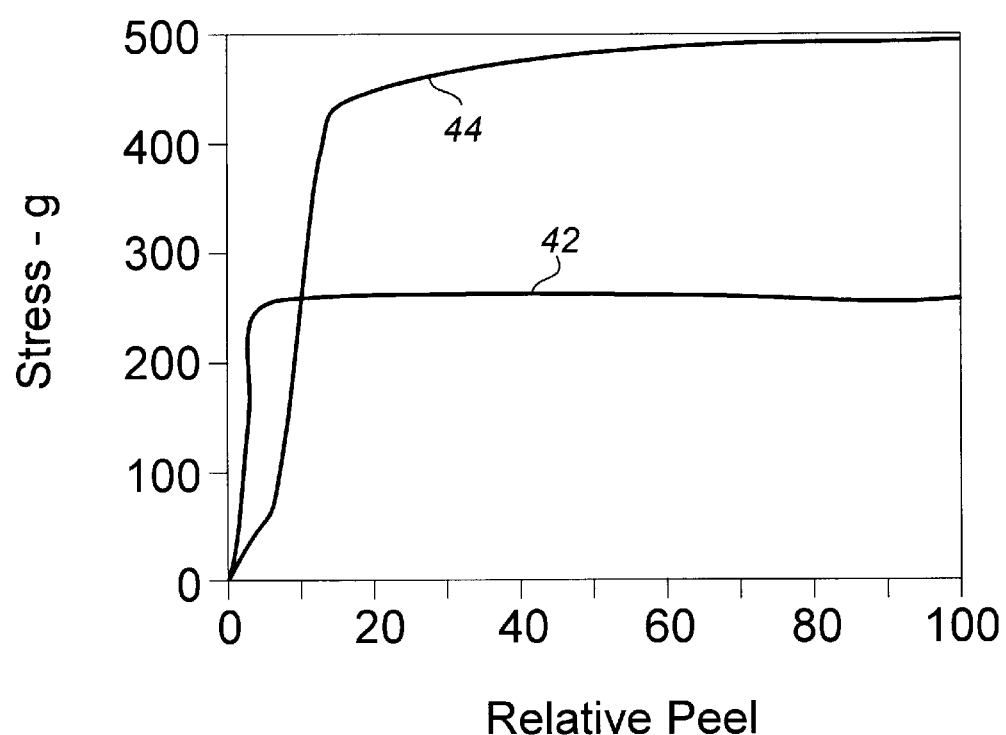
FIG. 4 is a graph of comparative interface adhesion between a battery electrode and current collectors treated according to the present invention with compositions of differing dispersed solids content.

A pretreatment composition was prepared similar to that of Example 2, with the exception that Super P conductive carbon was added in an amount of about 25% of the VdF-HFP copolymer solution solids. The resulting suspension was sprayed onto the copper grid and air-dried to obtain a coating of about 1 g/m² before heat-treatment at about 450° C. for one minute in the nitrogen atmosphere. Reinforcement of the treatment layer by the dispersed carbon resulted in the greater interface bond shown at trace 44 in FIG. 4, as compared to the yield point trace 42 of a pretreatment copolymer composition without added carbon.

EXAMPLE 6

Figure 5:
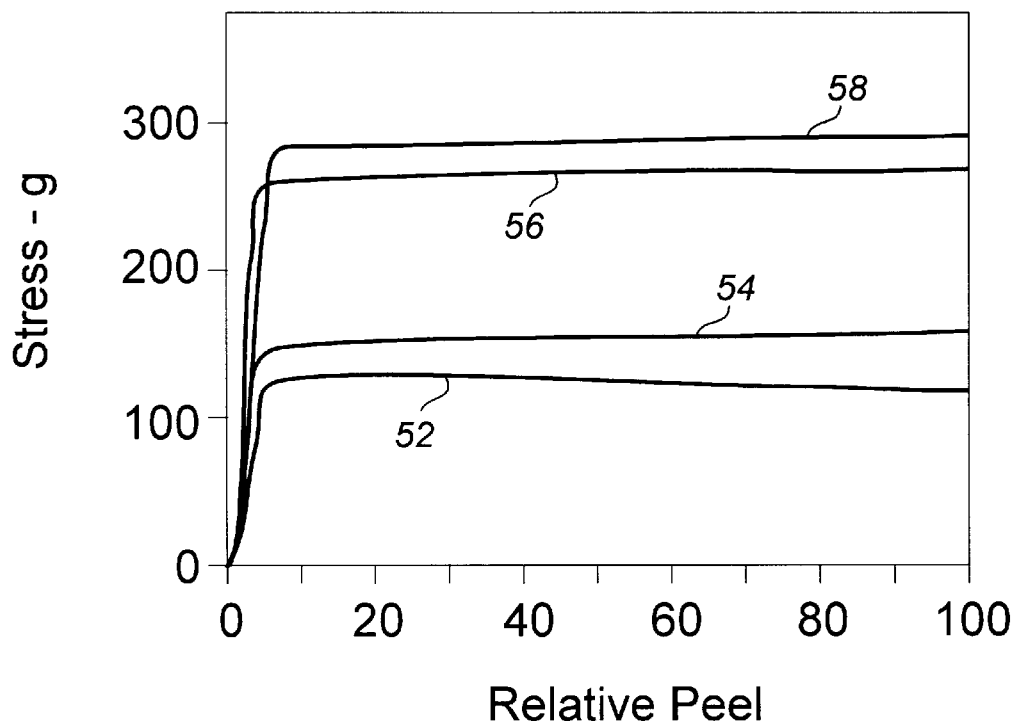
FIG. 5 is a graph of comparative interface adhesion between a battery electrode and current collectors treated according to the present invention with compositions of varying polymer content.

Acetone solutions of the VdF-HFP, without added carbon, were used as dip-coating treatment at copolymer concentrations of 0.25%, 0.5%, 0.75%, and 1.0% to prepare current collector grids in the inert atmosphere processing of Example 2. The respective adhesive bonds in laminate test samples are shown in FIG. 5 at traces 52, 54, 56, and 58.

EXAMPLE 7

Figure 6:
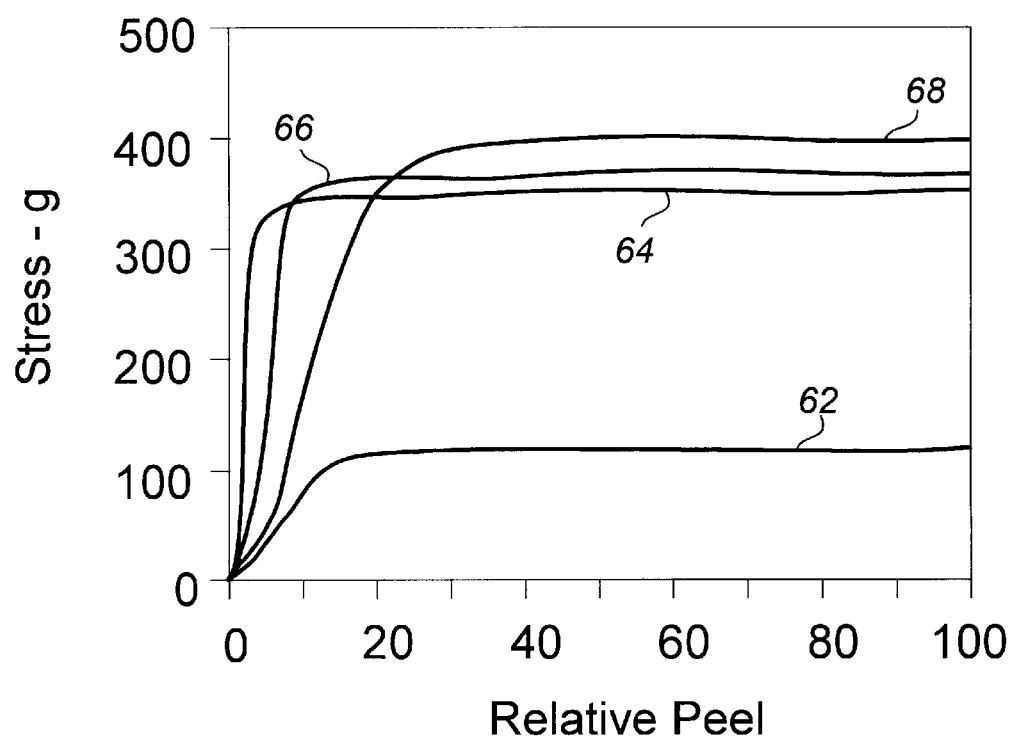
FIG. 6 is a graph of comparative interface adhesion between a battery electrode and current collectors of different metals treated according to the present invention.

Expanded metal grids of stainless steel, aluminum, copper, and nickel were pretreated and laminated according to the invention procedures of Example 2. Respective peel test results are shown are shown in FIG. 6 as traces 62, 64, 66, and 68. The lower yield point anomaly exhibited by the stainless steel sample is attributed in major part to the heavier gauge and resulting stiffness of the grid substrate which affected the test peel angle. With each material, however, the interface adhesion substantially exceeded the cohesive strength of the laminated electrode membrane.

EXAMPLE 8

Figure 7:
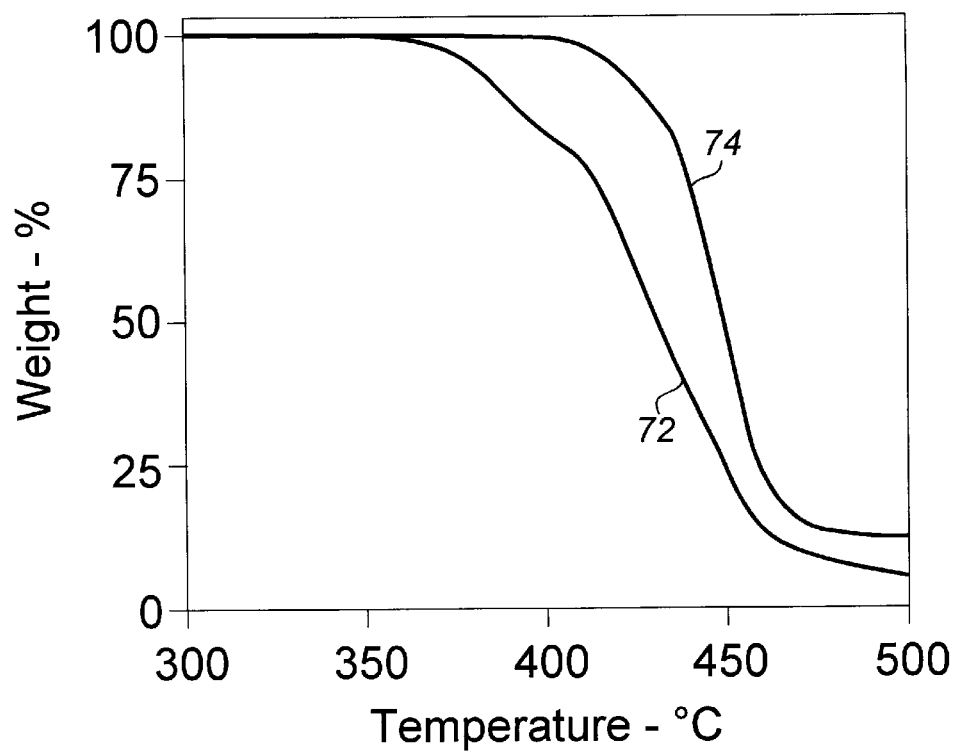
FIG. 7 is a graph of comparative thermogravimetric analyses of a current collector treatment polymer conducted in atmospheres of zero and 20% oxygen.
Figure 8:
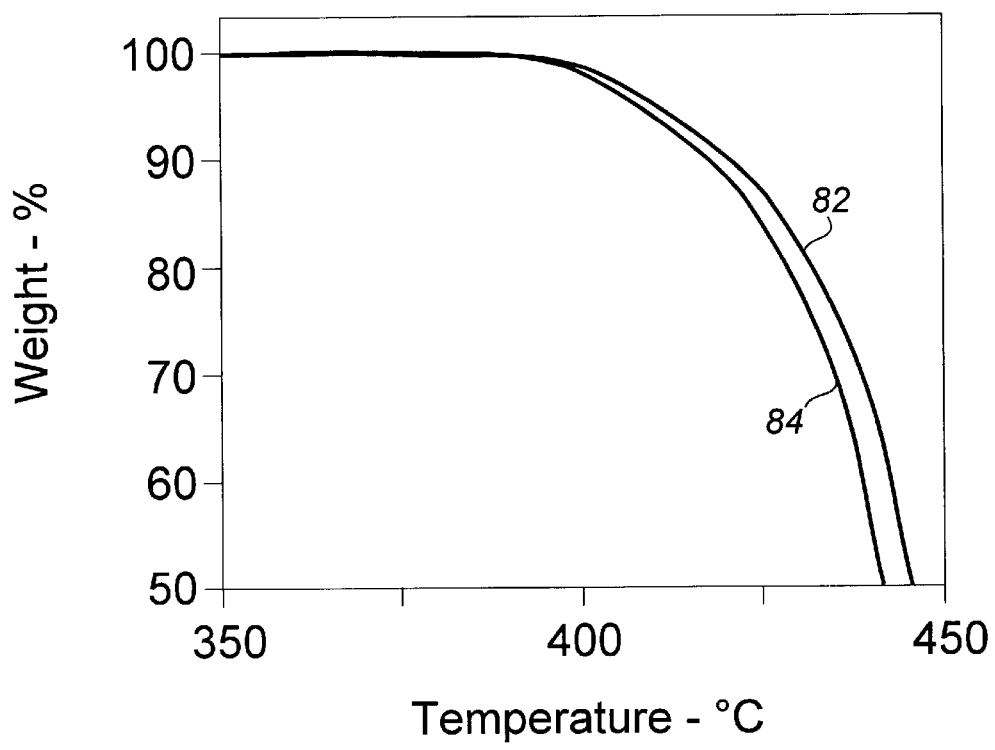
FIG. 8 is a graph of comparative thermogravimetric analyses of a current collector treatment polymer conducted in the presence and absence of a copper substrate.

Thermogravimetric analyses of the VdF-HFP pretreatment copolymer of Example 2 were conducted in the preferred nitrogen processing atmosphere and in an atmosphere of 20% oxygen simulating the simple prior art processing in air. The greater resulting rate of decomposition of the copolymer coating in air, as shown in FIG. 7 at trace 72, as compared with the rate in nitrogen, shown at trace 74, confirms the ability of the present invention to enable the more effective processing of the pretreatment film in the previously deleterious temperature range of about 400° C. to 425° C. Similar thermogravimetric testing of the film solely in the preferred nitrogen atmosphere, but on an inert platinum substrate as well as a copper grid substrate, reveals that the temperature-dependent decomposition of the copolymer is accelerated somewhat in the presence of the copper, as shown in FIG. 8 at trace 84. Depending upon the selected current collector material, routine experimentation to determine an optimum processing time and temperature within the higher ranges enabled by the present invention would therefore be advisable.

What is claimed is:

1. A method for improving the laminate adhesion under heat and pressure between a polymeric rechargeable battery electrode composition and a metallic current collector which comprises pretreating the surface of said collector by forming thereon a polymeric film compatible with said electrode composition and heating said film to effect adhesion thereof to said collector surface characterized in that said heating step is carried out in a non-oxidizing atmosphere.

2. A method according to claim 1 wherein said atmosphere consists essentially of nitrogen.

3. A method according to claim 1 wherein said heating step is carried out in a temperature range of about 350° C. to 450° C.

4. A method according to claim 3 wherein said heating step is carried out for a period of time up to about 2 minutes.

5. A method according to claim 1 wherein said polymeric film is formed as the dried residue of a 0.1% to 2.0% solution of the polymer of said electrode composition.

6. A method according to claim 5 wherein said polymeric film comprises up to about 25% homogeneously dispersed carbon.

* * * * *